US011865678B2

(12) United States Patent
Ross

(10) Patent No.: US 11,865,678 B2
(45) Date of Patent: Jan. 9, 2024

(54) DUAL PAWL RATCHET MECHANISM

(71) Applicant: Snap-on Incorporated, Kenosha, WI (US)

(72) Inventor: David T. Ross, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/165,089

(22) Filed: Feb. 2, 2021

(65) Prior Publication Data

US 2022/0241934 A1 Aug. 4, 2022

(51) Int. Cl.
*B25B 13/46* (2006.01)
*B25B 23/00* (2006.01)

(52) U.S. Cl.
CPC ........ *B25B 13/463* (2013.01); *B25B 23/0035* (2013.01)

(58) Field of Classification Search
CPC .......................... B25B 13/463; B25B 23/0035
USPC ................................................. 81/63.1, 58.2
See application file for complete search history.

(56) References Cited

U.S. PATENT DOCUMENTS

| | | | |
|---|---|---|---|
| 2,978,081 | A | 4/1961 | Lundin et al. |
| 5,174,176 | A | 12/1992 | Krivec |
| 5,522,288 | A | 6/1996 | Slusar et al. |
| 5,782,147 | A | 7/1998 | Chaconas et al. |
| 5,887,493 | A | 3/1999 | Main |
| 6,059,898 | A | 5/2000 | Fisher et al. |
| 6,109,141 | A | 8/2000 | Nurmi |
| 6,868,759 | B2 | 3/2005 | Tuan-Mu |
| 6,964,216 | B2 | 11/2005 | Chen |
| 7,207,244 | B2 | 4/2007 | Chen |
| 7,587,961 | B1 | 9/2009 | Chiang |
| 7,895,922 | B2 | 3/2011 | Hung |
| 7,975,574 | B2 | 7/2011 | Hu |
| 8,495,931 | B2 | 7/2013 | Sroka |
| 8,499,666 | B2 | 8/2013 | Hopper et al. |

(Continued)

FOREIGN PATENT DOCUMENTS

| | | |
|---|---|---|
| CA | 2682187 C | 5/2015 |
| CA | 2862187 C | 5/2015 |

(Continued)

OTHER PUBLICATIONS

Definition of Lateral found at: https://web.archive.org/web/20200512224207/https://www.merriam-webster.com/dictionary/lateral (Year: 2020).*

(Continued)

*Primary Examiner* — Don M Anderson
*Assistant Examiner* — Caleb Andrew Holizna
(74) *Attorney, Agent, or Firm* — Seyfarth Shaw LLP

(57) ABSTRACT

A ratchet mechanism of a ratchet wrench having a pawl carrier and first and second pawls. The pawl carrier includes a groove and is rotatable to cause selection of one of first and second drive directions. The first and second pawls are adapted to selectively engage with a toothed portion of a ratchet gear for selecting one of the first and second drive directions. Each of the first and second pawls includes a projection adapted to engage the groove when the pawl carrier is rotated to cause one of the first and second pawls to disengage from the toothed portion and the other of the first and second pawls to engage the toothed portion.

23 Claims, 10 Drawing Sheets

(56) References Cited

U.S. PATENT DOCUMENTS

| | | | | |
|---|---|---|---|---|
| 8,516,928 | B2 | 8/2013 | Hu | |
| RE44,655 | E | 12/2013 | Ross et al. | |
| 8,720,308 | B2 | 5/2014 | Hopper et al. | |
| 9,038,507 | B2 | 5/2015 | Thompson et al. | |
| 9,079,299 | B2 | 7/2015 | Lee et al. | |
| 9,364,940 | B2 | 6/2016 | Wu | |
| 9,707,668 | B2 | 7/2017 | Wu | |
| 9,709,141 | B2 | 7/2017 | Thompson et al. | |
| 10,016,880 | B2 | 7/2018 | Chung | |
| 10,029,353 | B2 * | 7/2018 | Hsieh | B25B 13/463 |
| 10,118,278 | B2 * | 11/2018 | Thompson | B25B 13/463 |
| 10,259,106 | B2 | 4/2019 | Chung | |
| 10,464,191 | B2 | 11/2019 | Anderson et al. | |
| 10,682,744 | B2 | 6/2020 | Lee | |
| 10,870,186 | B2 | 12/2020 | Ross | |
| 2005/0173090 | A1 | 8/2005 | Ling et al. | |
| 2008/0229887 | A1 * | 9/2008 | Thompson | B25B 13/463 81/62 |
| 2008/0229889 | A1 | 9/2008 | Hopper et al. | |
| 2010/0083795 | A1 | 4/2010 | Eggert | |
| 2011/0132149 | A1 | 6/2011 | Lee | |
| 2015/0059533 | A1 * | 3/2015 | Huang | B25B 13/463 81/62 |
| 2015/0328749 | A1 | 11/2015 | Thompson et al. | |
| 2017/0050299 | A1 | 2/2017 | Hsieh | |
| 2018/0272505 | A1 | 9/2018 | Ross | |
| 2019/0091839 | A1 | 3/2019 | Ross | |
| 2020/0189075 | A1 | 6/2020 | Thompson | |
| 2020/0269392 | A1 | 8/2020 | Thompson et al. | |

FOREIGN PATENT DOCUMENTS

| | | | |
|---|---|---|---|
| CA | 2890858 | C | 1/2018 |
| CA | 3010643 | A1 | 3/2019 |
| CN | 1296435 | A | 5/2001 |
| CN | 1572427 | A | 2/2005 |
| CN | 200963800 | Y | 10/2007 |
| CN | 203092440 | U | 7/2013 |
| DE | 202006013354 | | 11/2006 |
| DE | 10201004837 | A1 | 7/2011 |
| DE | 102010004837 | A1 | 7/2011 |
| DE | 202016103335 | | 9/2016 |
| DE | 102017120094 | | 2/2019 |
| EP | 1484135 | A1 | 8/2003 |
| EP | 2946884 | A1 | 11/2015 |
| GB | 820914 | | 9/1959 |
| TW | 483366 | U | 4/2002 |
| TW | M452834 | U | 5/2013 |
| TW | 201914764 | A | 4/2019 |
| TW | M588610 | U | 1/2020 |

OTHER PUBLICATIONS

Combined Search and Examination Report for corresponding Application No. GB2201243.9 dated Jul. 29, 2022, 7 pages.

Taiwan Office Action for corresponding Application No. 11121142150 dated Nov. 22, 2022, 17 pages.

Australian Examination Report No. 1 for corresponding AU Application No. 2022200456, dated Feb. 16, 2023, 4 pages.

Australian Examination Report No. 1 for corresponding AU Application No. 2022200294, dated Feb. 24, 2023, 4 pages.

Canadian Office Action for corresponding CA Application No. 3,147,480, dated Mar. 6, 2023, 5 pages.

Australian Examination Report No. 1 for corresponding AU Application No. 202220456 dated Feb. 16, 2023, 4 pages.

Chinese Office Action for corresponding Application No. 2022100822496 dated Oct. 14, 2023, 15 pages.

* cited by examiner

DUAL PAWL RATCHET MECHANISM

TECHNICAL FIELD OF THE INVENTION

The present invention relates generally to ratchet tools, and more particularly to ratchet tools having dual pawl ratchet mechanisms.

BACKGROUND OF THE INVENTION

Currently many dual pawl ratchet mechanisms are known and used. Typically, these mechanisms are incorporated into hand tools, such as ratchet wrenches and/or screwdrivers, or the like, so that there is a drive portion engageable with a work piece, for example, a bolt head. A first drive direction (e.g., clockwise) may be selected for the dual pawl ratchet mechanism so that use of the tool provides torque in a clockwise direction when engaged with the work piece and slipping or ratcheting when rotated in a second direction (e.g., counterclockwise). A second drive direction (e.g., counterclockwise) may be selected for the dual pawl ratchet mechanism so that use of the tool provides torque in a counterclockwise direction when engaged with the work piece and slipping or ratcheting when rotated in the first direction (e.g., clockwise).

Selection of the drive direction for the drive portion is dependent on which of two pawls is engaged with a ratchet gear. This mechanism typically effects the engagement of one pawl with a ratchet gear and disengagement of a second pawl with a ratchet gear via a manually actuable portion, commonly referred to as a reversing lever, per U.S. Pat. No. 8,499,666. Other known mechanisms use a pawl carrier to effect engagement and disengagement of the pawls, per U.S. Pat. No. 2,978,081. The mechanism described in U.S. Pat. No. 2,978,081 uses a wire to retain the pawls to the pawl carrier; however, assembling the wire to the pawl carrier requires additional parts and manufacturing time and complexity.

SUMMARY OF THE INVENTION

The present invention relates broadly to a hand tool, such as a ratchet wrench, that includes a ratchet mechanism for selectively engaging either one of first and second pawls with a ratchet gear to select one of either first and second drive directions (e.g., clockwise and counterclockwise). The pawls include projections that matingly engage grooves in a paw carrier to selectively cause controlled movement one of the pawls into an engaged position, wherein the pawl is engaged with the ratchet gear teeth, while the other of the pawls is disposed in a disengaged position, wherein the pawl is disengaged from the ratchet gear teeth. The present invention results in less components and simpler manufacturing, compared to current designs, and substantially uninterrupted pawl and gear teeth engagement.

In an embodiment, the present invention broadly comprises a tool. The tool includes a head portion having a cavity, a ratchet gear rotatably disposed in the cavity and having a drive portion and a toothed portion, wherein the drive portion projects outwardly from the cavity and is adapted to cause transmission of torque to a work piece, a pawl carrier pivotally disposed in the cavity and that includes a groove, and first and second pawls adapted to selectively engage with the toothed portion of the ratchet gear for selecting one of either first and second drive directions of the ratchet gear. Each of the first and second pawls includes a projection adapted to engage the groove, which causes one of the pawls to engage the toothed portion by pushing the pawl towards the ratchet gear, and the other of the pawl to disengage the toothed portion by pulling the pawl away from the ratchet gear.

In another embodiment, the present invention broadly comprises a ratchet mechanism that includes a pawl carrier that has a groove and pivotal to cause selection of one of first and second drive directions, and first and second pawls adapted to selectively engage with a toothed portion of a ratchet gear for selecting either one of the first and second drive directions. Each of the first and second pawls includes a projection adapted to engage the groove, which causes one of the pawls to engage the toothed portion by pushing the pawl towards the ratchet gear, and the other of the pawl to disengage the toothed portion by pulling the pawl away from the ratchet gear.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
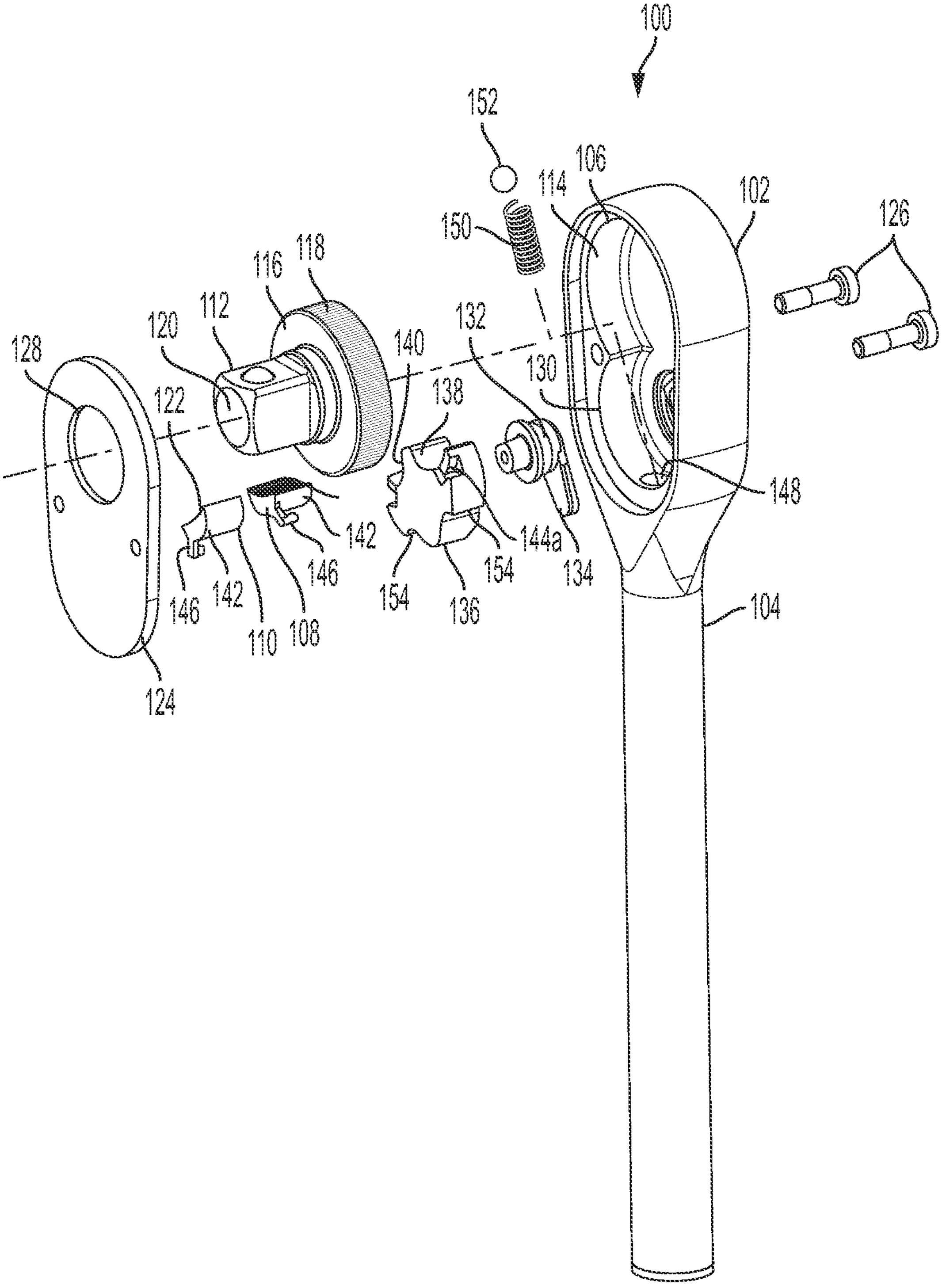
FIG. 1 is an exploded perspective view of an exemplar tool in a disassembled condition, according to an embodiment of the present invention.
Figure 2:
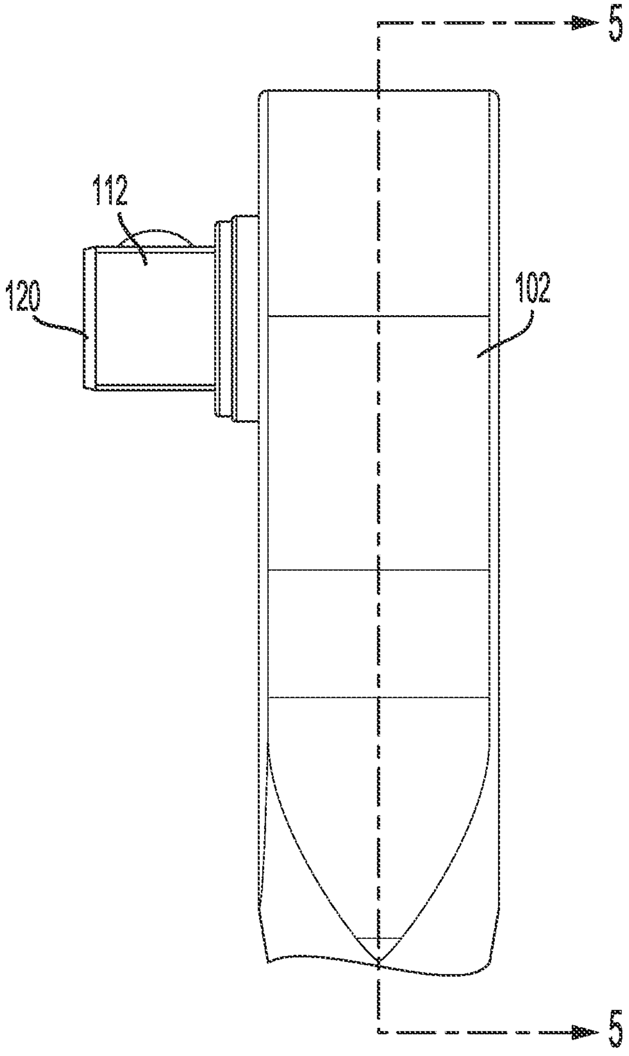
FIG. 2 is a side plan view of a head portion of an exemplar tool, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly comprises a tool, such as a ratchet wrench. The ratchet wrench includes a ratchet mechanism for selectively engaging a ratchet gear in first and second drive directions. The ratchet mechanism includes first and second pawls and a pawl carrier. The pawls each includes a projection, and the pawl carrier includes a groove, and preferably two grooves, wherein the projections of the pawls are adapted to engage the groove to selectively move the first pawl into an engaged position, wherein the first pawl engages the ratchet gear, and move the second pawl into a disengaged position, wherein the second pawl is disengaged from the ratchet gear. The present invention results in less components and simpler manufacturing, compared to current designs, and substantially uninterrupted pawl and gear teeth engagement.

Referring to FIGS. 1-6, an exemplary tool 100, such as, for example, a dual-pawl ratchet wrench, having a head portion 102 and a handle portion 104 is depicted. The head portion 102 includes a cavity 106 for receiving components of the tool 100 for providing torque to a working piece (not shown) such as a socket and/or a fastener.

Figure 3:
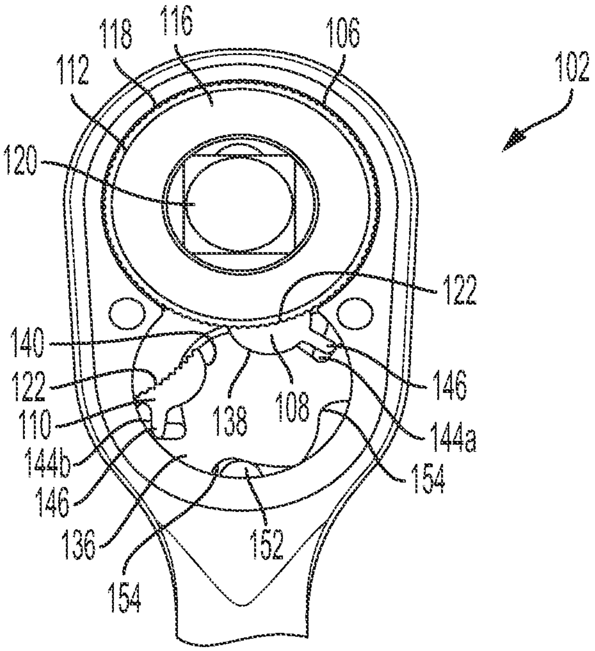
FIG. 3 is a front view of the head portion of FIG. 2, with the cover removed to view the interior components, with a first rotational drive direction selected.
Figure 4:
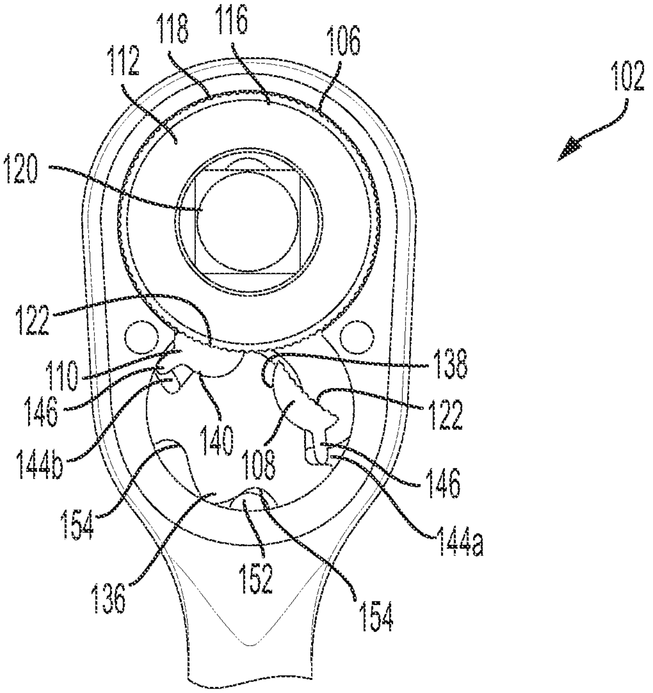
FIG. 4 is a front view of the head portion of FIG. 2, with the cover removed to view the interior components, with a second rotational drive direction selected.
Figure 5:
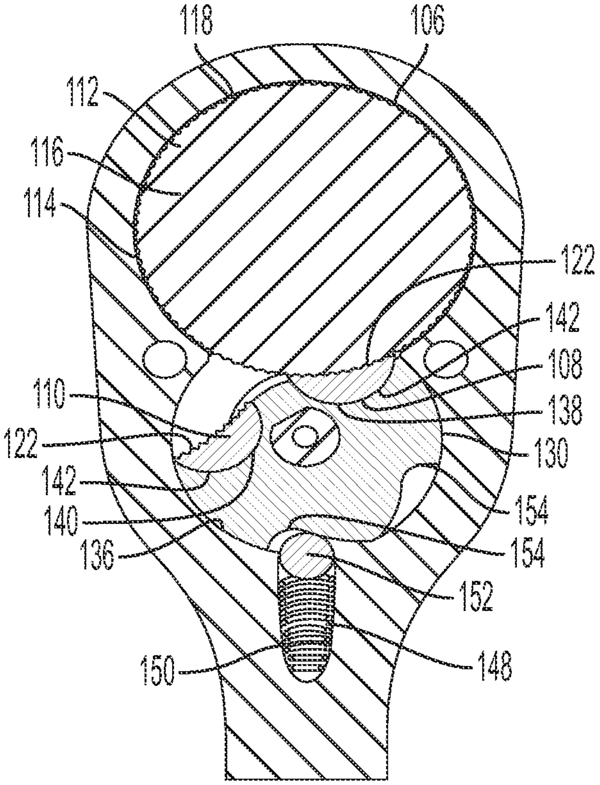
FIG. 5 is a sectional view of the head portion of FIG. 2, taken along line 5-5 of FIG. 2.
Figure 6:
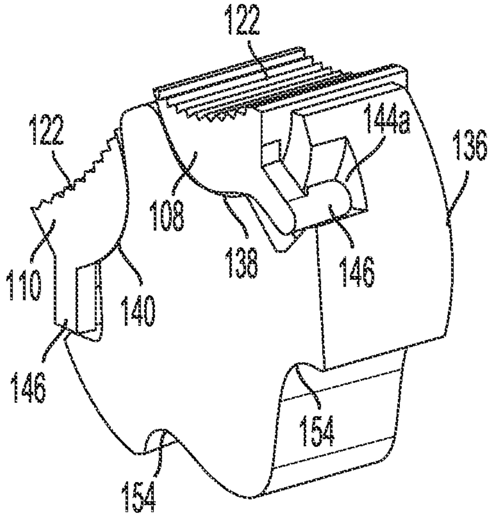
FIG. 6 is a perspective view of a pawl carrier and pawls, according to an embodiment of the present invention.
Figure 7:
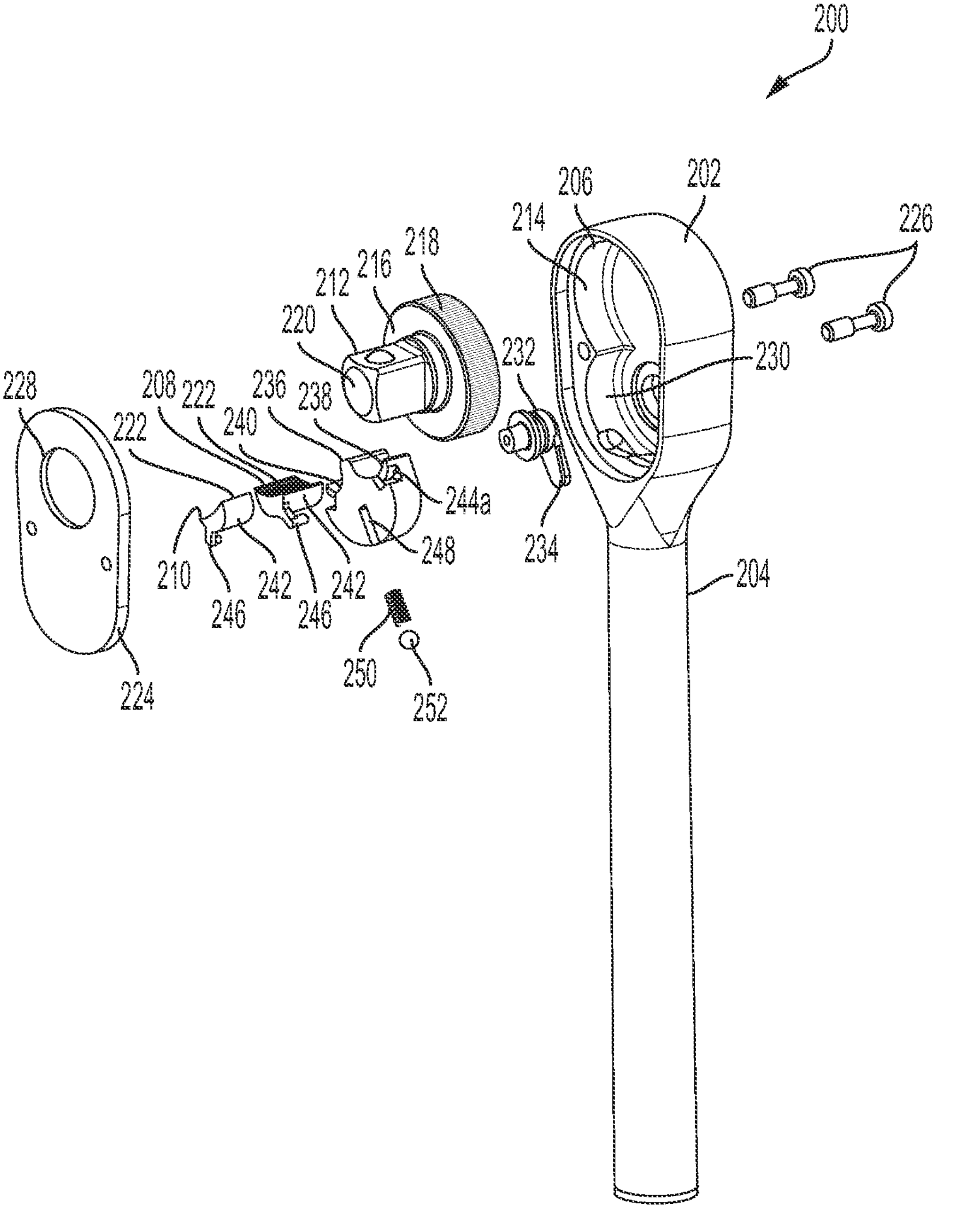
FIG. 7 is an exploded perspective view of another exemplar tool in a disassembled condition, according to another embodiment of the present invention.
Figure 8:
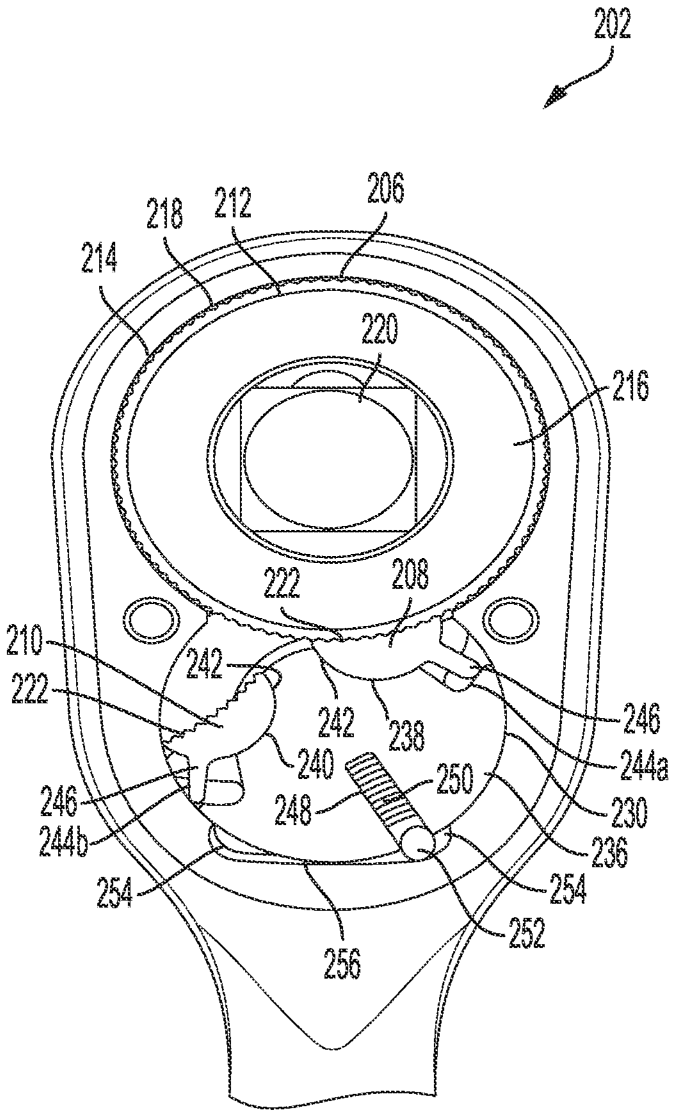
FIG. 8 is a front view of a head portion of the tool of FIG. 7 in an assembled condition, with the cover removed to view the interior components, with a first rotational drive direction selected.
Figure 9:
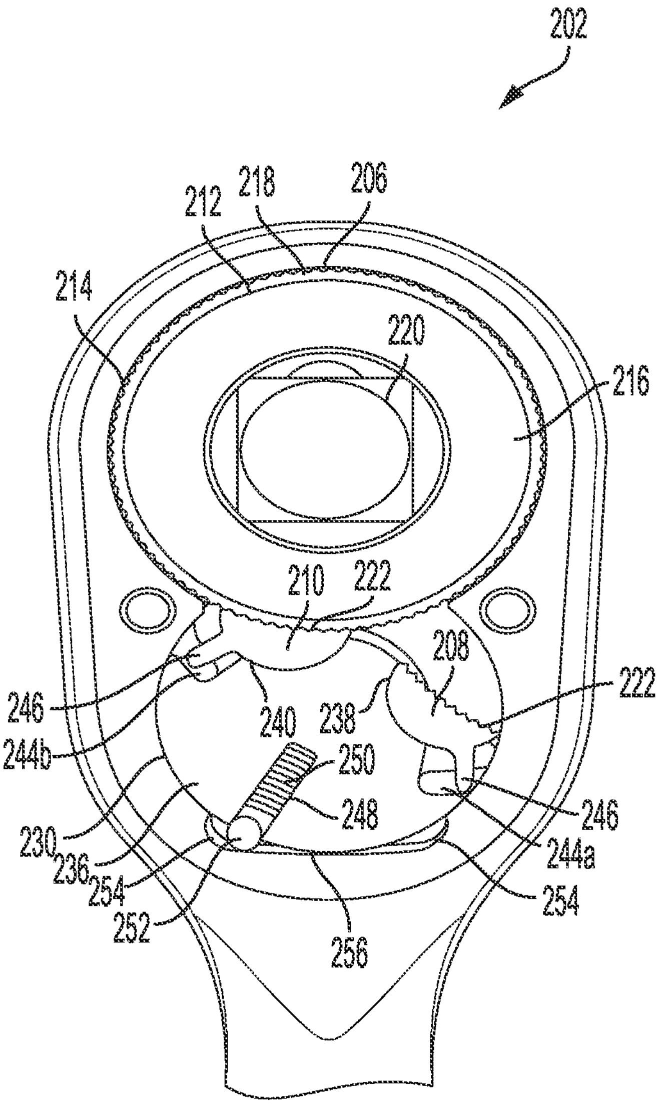
FIG. 9 is a front view of a head portion of the tool of FIG. 7 in an assembled condition, with the cover removed to view the interior components, with a second rotational drive direction selected.
Figure 10:
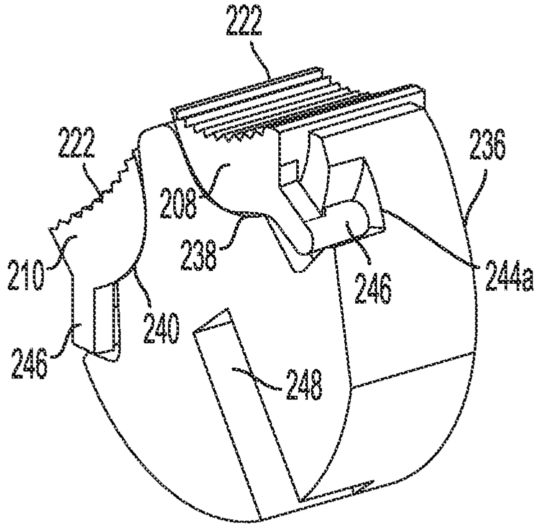
FIG. 10 is a perspective view of a pawl carrier and pawls, according to another embodiment of the present invention.

The head portion 102 includes first and second pawls 108, 110 disposed in the cavity 106. The first and second pawls 108, 110 are selectively engageable with a ratchet gear 112 that is operatively engageable with the work piece in a well-known manner. When the first pawl 108 engages the ratchet gear 112 (as illustrated in FIG. 3), torque drive is permitted with rotation of the head portion 102 in a first rotational direction while ratcheting occurs with rotation of the head portion 102 in a second rotational drive direction opposite the first rotational drive direction. Conversely, when the second pawl 110 is engaged with the ratchet gear 112 (as illustrated in FIG. 4), the first pawl 108 disengages the ratchet gear 112, and torque drive is permitted with rotation of the head portion 102 in the second rotational drive direction while ratcheting occurs with rotation of the head portion 102 in the first rotational drive direction.

The cavity 106 includes portions for respectively receiving and retaining components of the tool 100 therein. The ratchet gear 112 is received in a first large generally circular portion of the cavity 106, referred to herein as the drive cavity portion 114. The ratchet gear 112 has a generally circular body portion 116 with a circumferential toothed portion 118, and a drive portion 120, such as, for example, a square drive lug, projecting from the body portion 116. The toothed portion 118 selectively engages pawl teeth 122 formed on each of the pawls 108, 110 for selective engagement with the pawls 108, 110 to provide torque drive through the drive portion 120 in either of the first and second rotational drive directions.

A cover plate 124 is secured to the head portion 102 to enclose the components of the tool 100 in the cavity 106 in a well-known manner. In an embodiment, the cover plate 124 is retained to the head portion 102 using fasteners 126, such as, for example, screws, rivets, etc. The cover plate 124 includes an opening 128, such as, for example, a circular bore, through which the drive portion 120 projects for operative engagement with the work piece. The opening 128 also defines a bearing surface for the drive portion 120 to retain and position the ratchet gear 112.

The first and second pawls 108, 110 are disposed in a second portion of the cavity 106, referred to herein as the pawl cavity portion 130. The drive cavity portion 114 and pawl cavity portion 130 overlap or communicate to allow the first and second pawls 108, 110 to selectively move into and out of engagement with the toothed portion 118 of the ratchet gear 112.

An actuator 132 for selectively causing the engagement and disengagement of the first and second pawls 108, 110 with the ratchet gear 112 is provided. In an embodiment, the actuator 132 is disposed in the pawl cavity portion 130. The actuator 132 extends through the head portion 102 wherein a lever portion 134 of the actuator 132 is positioned on the outside of the head portion 102 and is adapted to be manually operated by a to select a drive direction of the tool. A seal (not illustrated) is circumferentially disposed around the lever portion 134 to impede or prevent contaminants or liquid from entering the cavity 106. In an embodiment, the actuator 132 is assembled with the head portion 102 by inserting the lever portion 134 into the pawl cavity portion 130 from a first side of the head portion 102, and by extending the lever portion 134 through an opening in the head portion 102 to a second side of the head portion 102, which promotes the ability to utilize the seal for preventing ingress of contaminants. The actuator 132 is sized to prevent complete passage through the opening, so the actuator 132 can be mounted in only one direction.

The actuator 132 is pivotally coupled to a pawl carrier 136 such that the pawl carrier 136 co-rotates with the actuator 132 to selectively position one of the pawls 108, 110 into engagement with the ratchet gear for selecting the torque drive direction. The pawl carrier 136 includes first and second recesses 138, 140. Each of the pawls 108, 110 includes a surface 142 opposite the pawl teeth that is correspondingly shaped to substantially correspond to the first and second recesses 138, 140. In an embodiment, the surface 142 is circular/arcuately shaped, and the first and second recesses 138, 140 have a concavity or convexity substantially similar to that of the circular/arcuately shaped surface 142 of each of the pawls 108, 110.

The pawl carrier also includes a groove, and preferably first and second grooves 144*a*, 144*b*, disposed adjacent the first and second recesses 138, 140. In an embodiment, the grooves 144*a*, 144*b* are formed along an arcuately shaped path to substantially correspond to the concavity or convexity shape of the first and second recesses 138, 140. The first and second pawls 108, 110 each includes a projection 146 adapted to respectively slidably engage the grooves 144*a*, 144*b*. For example, the projection 146 of the first pawl 108 engages the first groove 144*a*, and the projection 146 of the second pawl 110 engages the second groove 144*b*. Although two separate grooves 144*a*, 144*b* are illustrated, the invention is not limited as such and a single groove adapted to selectively engage the projection 146 of the respective first and second pawls 108, 110 could be used.

With reference to FIG. 3, as the pawl carrier 136 is shifted by the actuator 132 to a first position to select a first rotational drive direction, the first groove 144*a* engages the projection 146 of the first pawl 108 to push the first pawl 108 into engagement with the ratchet gear 112. Simultaneously, the second groove 144*b* engages the projection 146 of the second pawl 110 to cause the second pawl 110 to disengage from the ratchet gear 112. Accordingly, the pawl teeth 122 of the first pawl 108 remain in engagement with the toothed portion 118 of the ratchet gear 112 when the head portion

102 is moved in the first rotational drive direction. Conversely, with reference to FIG. 4, as the pawl carrier 136 is shifted by the actuator 132 to a second position to select a second rotational drive direction, the second groove **144*b* engages the projection 146 of the second pawl 110 to push the second pawl 110 into engagement with the ratchet gear 112. Simultaneously, the first groove 144*a* engages the projection 146 of the first pawl 108 to cause the first pawl 108 to disengage from the ratchet gear 112. Accordingly, the pawl teeth 122 of the second pawl 110 engages the toothed portion 118 of the ratchet gear 112 when the head portion 102** is moved in the second rotational drive direction.

The tool 100 is preferably designed to provide a tactile feel for the user to identify when the actuator 132 is in a proper position for selection of one of the torque drive directions. Towards this end, a ball and detent structure may be provided, as is common in devices of this type. More specifically, the head portion 102 may include a bore 148 into which a biasing member 150, such as, for example, a spring, and a ball or pin 152 are inserted. The ball 152 is retained in the bore 148 by the pawl carrier 136. Therefore, as the actuator 132 is rotated, the ball 152 contacts and moves along an outer surface of the pawl carrier 136. More specifically, the outer surface of the pawl carrier 136 includes a pair of detents 154 disposed thereon to engage the ball 152 when the actuator 132 is disposed in the proper position for selection of the first and second torque drive directions.

Referring to FIGS. 7-10, an exemplary tool 200, such as, for example, a dual-pawl ratchet wrench, having a head portion 202 and a handle portion 204 is depicted according to another embodiment. The tool 200 is substantially similar to the tool 100 described above, except for the ball and detent structure described below.

Similar to the tool 100, described above, the tool 200 is preferably designed to provide a tactile feel for the user to identify when the actuator 232 is in a proper position for selection of one of the torque drive directions. Towards this end, a ball and detent structure are provided, as is common in devices of this type. In this embodiment, the pawl carrier 236 has a bore 248 into which a biasing member 250, such as, for example, a spring, and a ball, or pin, 252 are inserted. The ball 252 contacts and is retained in the bore 248 by an interior surface 256 of the cavity 206. Therefore, as the actuator 232 is rotated, the ball 252 contacts and moves along interior surface 256 of the cavity 206. More specifically, the interior surface 256 of the cavity 206 includes a pair of detents adapted to engage the ball 252 when the actuator 232 is disposed in the proper position for selection of the first and second torque drive directions.

Figure 11:
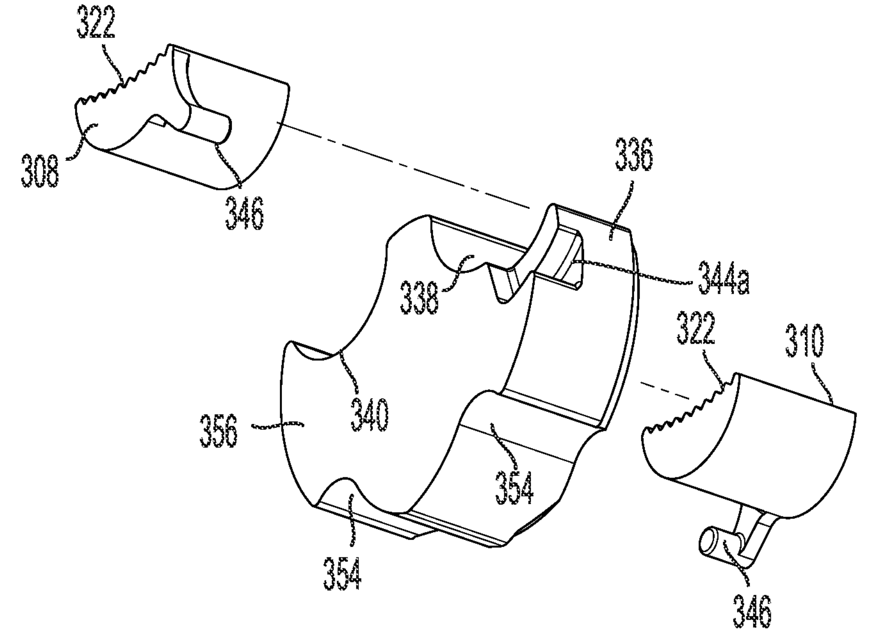
FIG. 11 is an exploded, perspective view of a pawl carrier and pawls in a disassembled state, according to another embodiment of the present invention.
Figure 12:
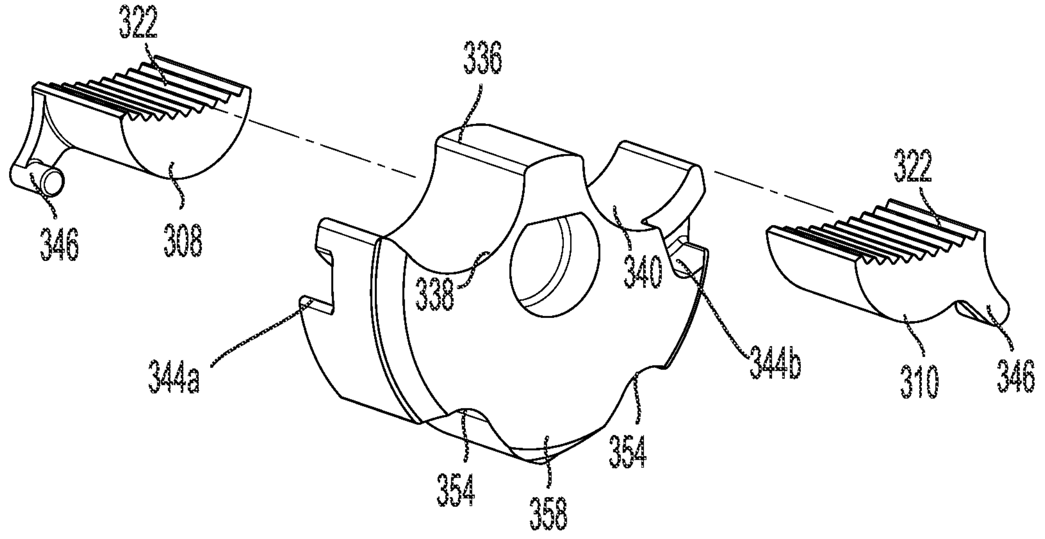
FIG. 12 is another exploded, perspective view of the pawl carrier and pawls of FIG. 11 in a disassembled state.

Referring to FIGS. 11 and 12, a pawl carrier 336 and pawls 308, 310, according to another embodiment of the present invention are illustrated. The pawl carrier 336 and pawls 308, 310 are substantially similar to the pawl carrier 136 and pawls 108, 110 described above, except for the location of the first and second grooves **344*a*, 344*b*, and the pawls 308, 310** are substantially identical, as described below.

Similar to the pawl carrier 136, described above, the pawl carrier 336 includes first and second grooves **344*a*, 344*b*, disposed adjacent the first and second recesses 338, 340. In this embodiment the first groove 344*a* is disposed on a first side 356 of the pawl carrier 336, and the second groove 344*b* is disposed on a second side 358 of the pawl carrier 336. In an embodiment, the grooves 344*a*, 344*b* are formed along an arcuately shaped path to substantially correspond to the concavity or convexity shape of the first and second recesses 338, 340. The first and second pawls 308, 310 each includes a projection 346 adapted to respectively slidably engage the grooves 344*a*, 344*b*. For example, the projection 346 of the first pawl 308 engages the first groove 344*a*, and the projection of the second pawl 310 engages the second groove 344*b* in a similar manner as described above. In this embodiment, the first and second pawls 308, 310** are substantially identical.

Generally, the design of the tool 100, 200 serves to retain and position each component within the head portion 102, 202, by the cover plate 124, 224, or through cooperation with one of the other components, thus minimizing the use of screws or other securements, for instance, and other manufacturing steps common to assembling dual pawl ratchet wrenches.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool comprising:
- a head portion having a cavity;
- a ratchet gear rotatably disposed in the cavity and having a drive portion and a toothed portion, wherein the drive portion projects outwardly from the cavity and is adapted to rotate in first and second drive directions;
- a pawl carrier rotatably disposed in the cavity and including first and second grooves; and
- first and second pawls adapted to selectively engage the toothed portion for selecting one of the first and second drive directions, wherein each of the first and second pawls includes pawl teeth and a substantially "L" shaped projection extending outwardly in a direction away from the pawl teeth, wherein the substantially "L" shaped projections are adapted to respectively engage the first and second grooves when the pawl carrier is rotated to cause one of the first and second pawls to disengage from the toothed portion and the other of the first and second pawls to engage the toothed portion.

2. The tool of claim 1, wherein the first drive direction is selected when the first pawl is engaged with the toothed portion and the second pawl is disengaged from the toothed portion, and the second drive direction is selected when the first pawl is disengaged from the toothed portion and the second pawl is engaged with the toothed portion.

3. The tool of claim 1, further comprising a reversing lever coupled with the pawl carrier, wherein the reversing lever is movable between and to first and second lever positions respectively corresponding to the first and second drive directions.

4. The tool of claim 1, wherein the pawl carrier includes first and second recesses.

5. The tool of claim 1, further comprising a biasing member and a ball, wherein the head portion includes a bore adapted to receive the biasing member and the ball.

6. The tool of claim 5, wherein the pawl carrier includes detents positioned thereon to correspond to proper positions for the ball for selection of one of the first and second drive directions, wherein the ball is biased by the spring into engagement with the corresponding detent when one of the first and second drive directions is selected.

7. The tool of claim 1, further comprising a cover plate attachable to the head portion for closing the cavity, the cover plate includes an opening that is adapted to receive the drive portion projecting outwardly from the cavity.

8. The tool of claim 1, wherein each of the first and second grooves is formed along a substantially arcuately shaped path.

9. The tool of claim 1, further comprising a biasing member and a ball, wherein the pawl carrier includes a bore adapted to receive the biasing member and the ball.

10. The tool of claim 9, wherein the cavity includes detents formed on an interior surface to correspond to proper positions for the ball for selection of one of the first and second drive directions, wherein the ball is biased by the spring into engagement with the corresponding detent when one of the first and second drive directions is selected.

11. The tool of claim 1, wherein the first groove is disposed on a first side of the pawl carrier, and the second groove is disposed on a second side of the pawl carrier.

12. The tool of claim 11, wherein the first and second pawls are substantially identical.

13. The tool of claim 1, wherein the substantially "L" shaped projection includes first and second portions, the first portion extends outwardly in the direction away from the pawl teeth, and the second portion extends substantially orthogonal to the first portion.

14. A ratchet mechanism comprising:

a pawl carrier including first and second grooves and rotatable to cause selection of either one of first and second drive directions; and first and second pawls adapted to selectively engage a toothed portion of a ratchet gear for selecting one of the first and second drive directions, wherein each of the first and second pawls includes pawl teeth and a substantially "L" shaped projection extending outwardly in a direction away from the pawl teeth, wherein the substantially "L" shaped projections are adapted to respectively engage the first and second grooves when the pawl carrier is rotated to cause one of the first and second pawls to disengage from the toothed portion and the other of the first and second pawls to engage the toothed portion.

15. The ratchet mechanism of claim 14, wherein the first drive direction is selected when the first pawl is engaged with the toothed portion and the second pawl is disengaged from the toothed portion, and the second drive direction is selected when the first pawl is disengaged from the toothed portion and the second pawl is engaged with the toothed portion.

16. The ratchet mechanism of claim 14, further comprising a reversing lever coupled with the pawl carrier, wherein the reversing lever is movable between and to first and second lever positions respectively corresponding to the first and second drive directions.

17. The ratchet mechanism of claim 14, wherein the pawl carrier includes first and second recesses.

18. The ratchet mechanism of claim 14, wherein the pawl carrier includes detents positioned thereon to correspond to proper positions for a ball for selection of one of the first and second drive directions, wherein the ball is biased by a spring into engagement with the corresponding detent when one of the first and second drive directions is selected.

19. The ratchet mechanism of claim 14, wherein the pawl carrier includes a bore adapted to receive a biasing member and a ball.

20. The ratchet mechanism of claim 14, wherein each of the first and second grooves is formed along a substantially arcuately shaped path.

21. The ratchet mechanism of claim 14, wherein the first groove disposed on a first side of the pawl carrier, and the second groove is disposed on a second side of the pawl carrier.

22. The ratchet mechanism of claim 14, wherein the first and second pawls are substantially identical.

23. The ratchet mechanism of claim 14, wherein the substantially "L" shaped projection includes first and second portions, the first portion extends outwardly in the direction away from the pawl teeth, and the second portion extends substantially orthogonal to the first portion.

* * * * *